Jan. 7, 1964   H. G. HAAS ETAL   3,116,637
WEIGHT DISTRIBUTION INDICATING APPARATUS
Filed Feb. 18, 1960   2 Sheets-Sheet 1
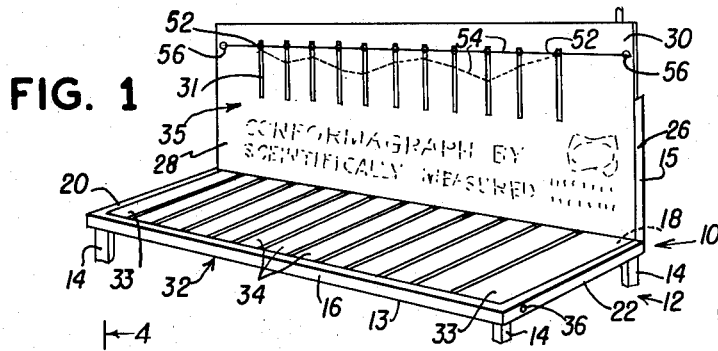
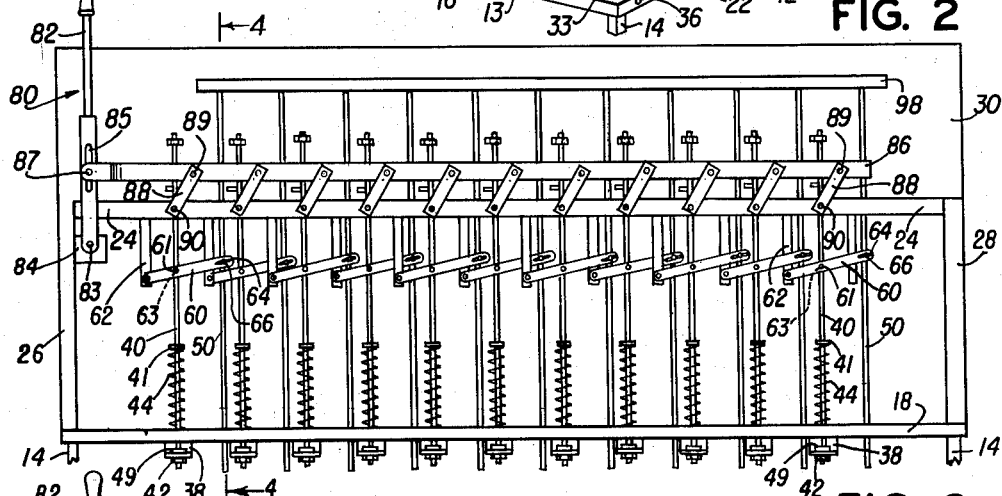
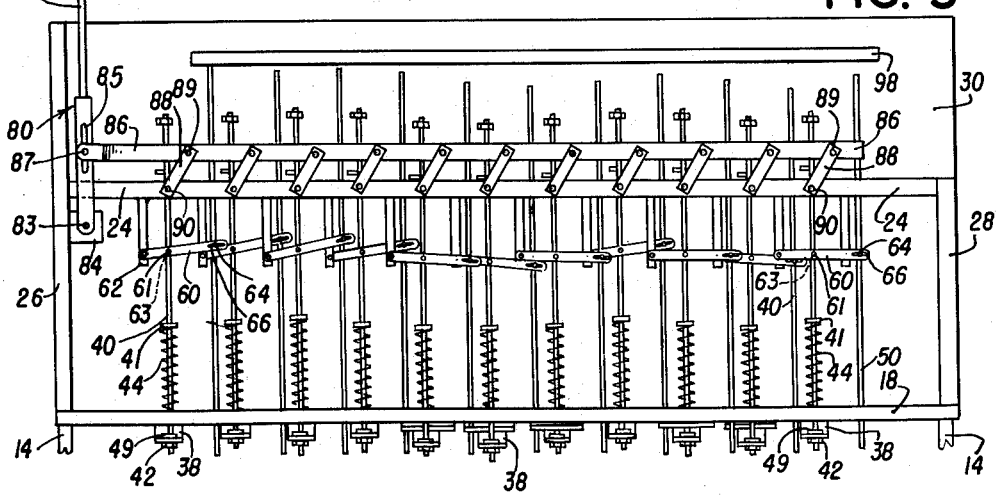
Inventors
Howard G. Haas
Milton L. Sturm &
Lee R. Foster
By
Byron, Hume, Groen and Clement
Attys.

Jan. 7, 1964
H. G. HAAS ETAL
3,116,637
WEIGHT DISTRIBUTION INDICATING APPARATUS
Filed Feb. 18, 1960
2 Sheets-Sheet 2
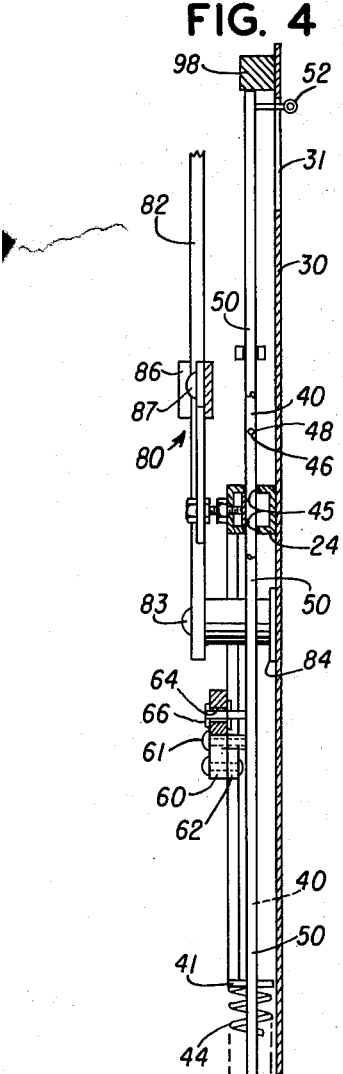
FIG. 4
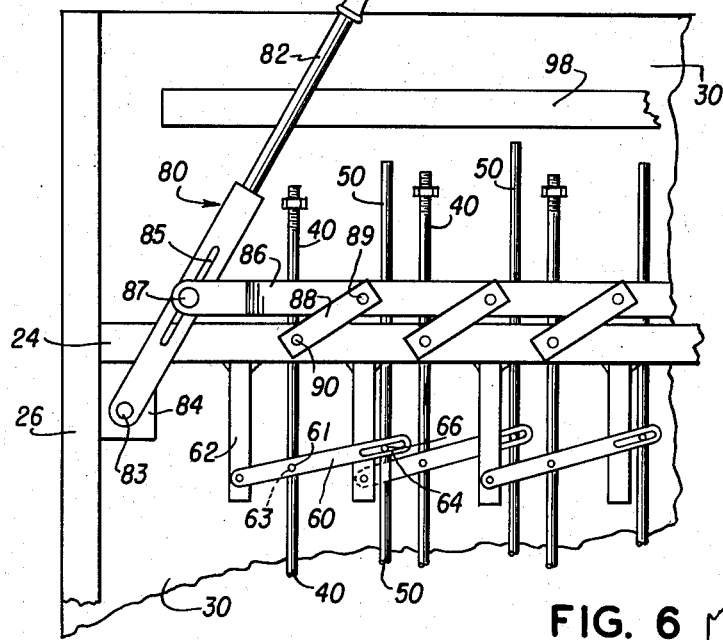
FIG. 5
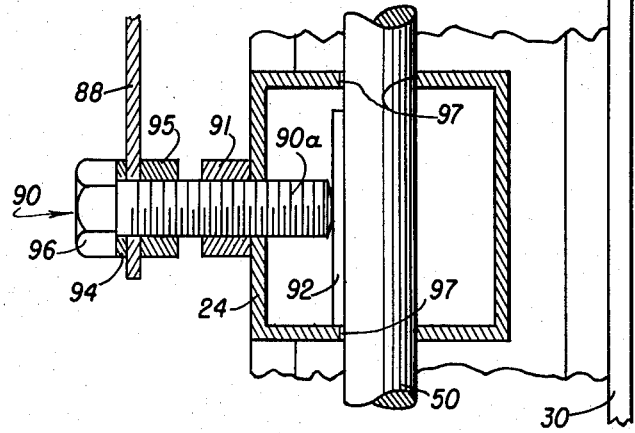
FIG. 6
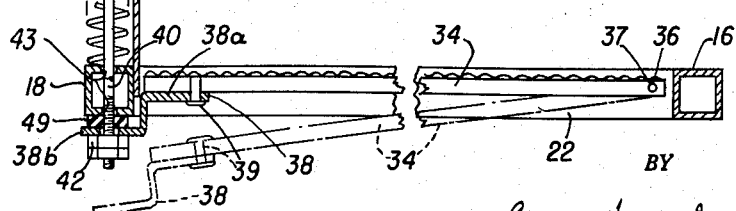
INVENTORS
Howard G. Haas
Milton L. Sturm &
Lee R. Foster
BY Byron, Hume, Groen and Clement
Attys.

United States Patent Office 3,116,637
Patented Jan. 7, 1964

3,116,637
WEIGHT DISTRIBUTION INDICATING
APPARATUS
Howard G. Haas, Glencoe, Milton L. Sturm, Chicago, and Lee R. Foster, Berwyn, Ill., assignors to Sealy Incorporated, a corporation of Delaware
Filed Feb. 18, 1960, Ser. No. 9,581
7 Claims. (Cl. 73—172)

The present invention relates to an apparatus for determining the weight distribution of a body and, more particularly, to an apparatus for visually indicating the weight distribution of the body lying in a horizontal position.

It is an object of the present invention to provide a new and improved apparatus for determining the weight distribution of a body.

It is another object of the present invention to provide a weight distribution indicating apparatus which has particular application in determining the type of supporting coils to be used in a mattress to assure correct sleeping posture of a body lying on the mattress.

It is a further object of the present invention to provide an apparatus wherein the weight distribution of a body is visually indicated on the apparatus.

It is yet a further object of the present invention to provide an apparatus that visually indicates the weight distribution of a body after the body is removed from the apparatus.

It is yet another object of the present invention to provide a new and improved weight distribution indicating apparatus that can be readily assembled and inexpensively manufactured.

The above and other objects are realized in accordance with the present invention by providing a new and improved weight distribution indicating apparatus that has particular utility in manufacturing a special-type mattress for correctly supporting a body lying on the mattress. The indicating apparatus includes a supporting means which simulates the supporting surface of a mattress and readily supports the body in a prone position. The supporting means is responsive to the weight distribution of the body and operates an indicating means which visibly indicates the weight distribution of the body.

In one aspect of the present invention, the visual indicating means is adapted to be latched when the body is on the apparatus, whereby the weight distribution of the body is visually represented after the body is removed from the apparatus. Thus, a recording of the weight distribution can be leisurely made without having the body lying on the apparatus.

In another aspect of the present invention, the supporting means is displaced in accordance with the weight distribution of the body and this displacement is directly transmitted to the visual indicating means. However, in order to clearly represent the weight distribution of the body, the relative displacements of the supporting means is exaggerated or amplified by the visual indicating means.

The invention, both as to its organization and method of operation, taken with further objects and advantages thereof, will best be understood by reference to the following description taken in connection with the accompanying drawing, in which:

FIG. 1 is a perspective view of a weight distribution indicating apparatus embodying the principles of the present invention;

FIG. 2 is an enlarged back elevational view of the apparatus in FIG. 1, illustrating the position of its components, when the apparatus is not in use;

FIG. 3 is an enlarged back elevational view, similar to FIG. 2, illustrating the position of the components when the apparatus is in use;

FIG. 4 is an enlarged sectional view along the line 4—4 of FIG. 2;

FIG. 5 is a further enlarged, fragmentary back elevational view of the apparatus of FIG. 1, showing a latching mechanism in operative position; and FIG. 6 is a greatly enlarged fragmentary sectional view of a part of the latching mechanism of FIG. 5.

Referring now to the drawings, a weight distribution indicating apparatus embodying the features of the present invention is illustrated in FIG. 1 and is identified generally by reference numeral 10. The apparatus is used to determine the weight distribution of a body, for example, a human being or individual, so that a mattress having proper supporting coils can be produced to assure maximum comfort and support for the individual. In use, the individual lies down on the apparatus 10 and the weight distribution of the individual is detected and graphically represented by the apparatus.

More specifically, and as shown in FIGS. 1 and 2, the apparatus 10 comprises a frame 12 spaced from a floor (not shown) by a plurality of spaced apart, vertical legs 14. The frame 12 includes a generally horizontal portion 13 and a generally vertical portion 15 extending upwardly along the rear of the horizontal portion 13. The horizontal portion 13 specifically comprises a pair of generally parallel front and rear rails 16 and 18 interconnected by a pair of side rails 20 and 22, which rails 16, 18, 20, and 22 are made of steel, steel alloy, aluminum, or the like structural material and form a generally rectangular configuration. The vertical portion 15 includes the rear rail 18 and, in addition, an upper support rail 24 (see FIG. 2) interconnected by a pair of side rails 26 and 28, which rails 18, 24, 26 and 28 are also made of steel, steel alloy, aluminum or the like structural material and form a generally rectangular configuration. As best shown in FIG. 1, a generally rectangular back panel 30, made of fibrous, plastic or the like material, is suitably secured to the front parts of the rails 18, 24, 26 and 28 and extends vertically above the upper support rail 24 a substantial distance. As shown, the back panel 30 is provided with a plurality of spaced apart vertically extending slots 31 for permitting the graphic representation of an individual's weight distribution.

In accordance with the present invention, supporting means 32 is mounted to the horizontal portion 14 of the frame and serves to simulate a mattress or a bed on which an individual is able to lie down. With an individual in a prone position on the apparatus 10, a visual indicating means 35 is actuated by the supporting means 32 through suitable interconnecting mechanism. The viewable part of the indicating means 35 is located adjacent to the front of the panel 30 and provides the graphic illustration of the weight distribution of the individual.

Considering now in greater detail the supporting means 32, it comprises a plurality of generally rectangular, spaced apart slats that extend between the front and rear rails 16 and 18, which slats comprise downwardly facing channels. The extreme side slats 33 are fixedly secured at their ends by suitable fasteners to the rails 16 and 18, while the intermediate slats 34 are pivotally supported from the front rail 16 and are resiliently supported from the rear rail 18, as described below. Thus, when an individual lies down on the middle portions of the slats 34, the rear ends of the slats 34 are depressed proportionately to the amount of weight supported by their associated slats 34. If desired, a plastic or cloth mat can be placed over the slats 34 to provide a cushioned support for the back of the individual.

In view of the fact that the slats 34 and associated mechanisms are identical in construction, only one slat 34 and its associated mechanism will be described to simplify the description.

Attention is now directed to FIG. 4 wherein the front end of a slat 34 is shown fastened to a hinge bar 36 which extends between and is fixedly secured to the rails 20 and 22. The bar 36 is spaced slightly rearwardly of the rail 16 and passes through openings 37 defined in the flanges of the channel slat 34. As shown the bar 36 is oriented in a substantially horizontal position so that the rearward end of the slat 34 is able to move downwardly into its inclined position illustrated in dotted lines in FIG. 4. In its normal horizontal position, the slat 34 is spring-biased into engagement with the undersurface of the horizontal part of the rail 18. Actually, the rear end of the slat 34 is resiliently connected to the rail 18 through a Z-bar 38 fastened to an actuator rod 40 having an integral disc 41, the disc 41 being in engagement with a spring 44 which rests on the upper surface of the rail 18.

More specifically, each Z-bar 38 includes a first horizontal attaching flange 38–a suitably secured to the undersurface of the rear end of the slat 34 by a fastener 39 and a second horizontal attaching flange 38–b which is suitably apertured to accommodate the lower end of the attaching rod 40. A locking-nut 42 is threaded on the rod 40 and supports the lower surface of the flange 38–b and hence the slat 34. A rubber grommet 49 is disposed about the rod 40 above the attaching flange 38–b and below the rail 18 so that the Z-bar 38 resiliently abuts against the rail 18 through the grommet 49. As clearly shown in FIG. 4, the bar 40 extends upwardly through both the lower rail 18 and the support rail 24 and, in this connection, somewhat oversized openings 43 and 45 are defined in the rails 18 and 24, respectively. By this arrangement, the actuator rod 40 is connected to the rear end of the slat 34 through the Z-shaped bar 38 and is loosely supported and guided in the openings 43 and 45 of the rails 18 and 24. As shown, the lower end of the spring 44 seats on the upper surface of the lower rail 18 and its upper end abuts against the undersurface of the cap 41 which is suitably soldered to the actuator rod 40. Consequently, as the slat 34 is displaced downwardly, the actuator rod 40 moves downwardly a corresponding amount, whereby the cap 41 causes the spring 44 to compress. As is well known, progressively greater displacements of the slat 34 cause a progressively greater compression of the spring 44, with the result that a progressively greater force is developed to oppose the weight on the slat 34. The coefficient of compression for the spring 44 is such that average heavy-weight individuals do not compress the spring 44 completely, with the result that the slat 34 and actuator rod 40 do not move to their maximum displaced positions.

In order to limit the downward movement of the slat 34, a limit pin 46 is inserted through a suitable aperture 48 defined transversely through the actuator rod 40. The opening 48 is located above the support rail 24 a distance exactly equal to the desired maximum displacement of the rear-end of the slats 34. Consequently, if a large weight is placed on the slat 34 and the spring 44 is readily compressed without overcoming the weight, the pin 46 engages the upper surface of the rail 24 to prevent the slat 34 from moving beneath its desired maximum displaced position. In addition, it will be appreciated that the limit pin 46 prevents the slat 34 from assuming an inclined position which would cause an individual lying on the slat 34 to slide towards the rear panel 30.

From the foregoing description, it will be understood that when an individual lies along the middle of the slats 34, each slat 34 will be displaced a different amount, depending upon the weight distribution of the individual. For example, since the weight of an individual is concentrated in his chest and lower back, those slats 34 located immediately adjacent the chest and lower back are displaced proportionately more than the slats 34 located immediately adjacent the head or feet of the individual.

For the purpose of visually indicating the weight distribution of the individual on the slats 34, the visual indicating means 35 is provided and the indicating means 35 comprises a plurality of indicator rods 50 which respectively have a plurality of eyelets 52 extending forwardly from the rods 50 through the slots 31. A cord or the like 54 is threaded through and interconnects the eyelets 52 to provide a graphic representation of the weight distribution of the individual or, more specifically, a graphic representation of the amount of displacement of each slat 34. When the apparatus 10 is not in use, the eyelets 52 are located adjacent the upper ends of the slot 31 and the cord 54 is in a generally horizontal position. The cord remains taut because suitable weights (not shown) are secured to its ends. In order to avoid an unsightly appearance, the cord 54 passes through a pair of openings 56 defined in the back panel so that its ends can be connected to the weights (not shown) which are located adjacent the backside of the panel 30. Of course, a spring-coiled pulley, a suitable windup mechanism, or an elastic cord could alternatively be employed to maintain the cord or the like 54 taut at all times.

Inasmuch as the indicator rods 50 are all identical in construction and operation, only one rod 50 will be described in detail to simplify the description.

As best shown in FIGS. 3 and 4, each indicator rod 50 lies immediately behind a slot 31 so that its eyelet 52 can extend through the slot 31. The indicator rod 50 slides through vertically aligned openings 97 (see FIG. 6) defined in the upper and lower horizontal walls of the rails 18 and 24. The intermediate portion of each indicator rod 50 is mechanically connected to an actuator rod 40 through a lever arrangement including a lever 60. The left end of the lever 60 (as seen in FIG. 3) is pivotally secured to the bottom of a plate 62 which depends downwardly from and is fixedly secured to the lower wall of the support rail 24. The lever 60 and the actuator rod 40 are actually connected together by a pin-and-slot arrangement. Specifically, at a point approximately one-third the distance from the left end of the lever 60, the lever 60 is pivotally secured to the actuator rod 40 by a pin 61 comprising, preferably, a double-headed rivet. The pin 61 extends through an opening 63 defined in the lever 60, which opening 63 is somewhat oversized to avoid binding of the lever 60 and actuator rod 40 incident to vertical movement of the rod 40. In a generally similar manner, a connection is obtained between the indicator rod 50 and the lever 60 by a pin-and-slot construction. Particularly, an elongated slot 64 is defined in the right end of the lever 60 to accommodate a pin 66 fixedly secured to the intermediate portion of the indicator rod 50. Accordingly, in response to the downward movement of the slat 34 and hence, the actuator rod 40, the indicator rod 50 and its associated eyelet 52 move downwardly.

In accordance with an aspect of the present invention, the indicating means 35 somewhat exaggerates the relative weight distribution of an individual lying on the slats 34. Instead of the eyelets 52 of the rods 50 being displaced by an amount equal to the displacement of the rear ends of the slats 34, the eyelets 52 move downwardly on the back panel 30 a distance equal to approximately three times the displacement of the slats 34 and the actuator rods 40. It will be understood that the exaggerated or amplified graphic representation of weight distribution is more readily and easily understood by a viewer. Moreover, a slight weight difference in adjacent parts is more easily recognized when the relative position of the eyelets 52 is approximately three times the relative displacement of the corresponding slats 34 and actuator rods 40. The somewhat exaggerated or amplified weight distribution graph is obtained by the above-described lever arrangement including the lever 60, actuator rod 40, and indicator rod 50. Specifically, by locating the pivot pin 62 at a distance of approximately one-third from the end of the lever 60, a 3 for 1 ratio of eyelet movement to slat displacement is obtained.

It will be appreciated that when a person climbs on and off of the slats 34, the eyelets 52 move upwardly and downwardly depending upon the change of position of the individual. Thus, in the absence of latching the indicating means 35, the eyelets 52 and the cord 54 graphically represent the true weight distribution of an individual only when he is in a prone position on top of the slats 34. With an individual lying on the slats 34, the eyelets 52 and cord 54 assume a position indicated in dotted lines in FIG. 1, while the actuator rods 40, levers 60, and indicator rods 50 assume the positions illustrated in FIG. 3. However, without latching the indicating means 35, as soon as the person climbs off the slats 34, the eyelets 52 and cord 54 return to their generally horizontal position, as shown in solid lines in FIG. 1, while the actuator rods 40, levers 60, and indicator rods 50 assume the positions illustrated in FIG. 2.

Hence, without the latching mechanism described below, an individual who lies on the apparatus 10 does not have an opportunity to view his own weight distribution from the same vantage point as a salesman or companion, and, further, any recording of the weight distribution must be made while the individual lies on the apparatus 10.

In accordance with another aspect of the present invention, the weight distribution of an individual is graphically illustrated by the indicating means 35 after the individual climbs off the apparatus 10. In this connection, a latching mechanism 80 is operated to effect the latching of the eyelets 52 and cord 54 when an individual rests on the slats 34. With the latching mechanism operative, an individual may shift his weight on the slats 34, change his position, and may climb off the apparatus 10 without disturbing or changing the graphic representation of his weight distribution.

More specifically, the latching mechanism 80 comprises, as best seen in FIG. 5, a latching handle 82 pivotally supported on a pin 83 suitably secured to a plate 84 which is welded to the vertical rail 26. The latching handle 82 is movable from a vertical inoperative position, illustrated in FIGS. 2 and 3, to an inclined operative position illustrated in FIG. 5. It is drivingly connected to a generally horizontal, locking rail 86 through a slot-and-pin arrangement including a pin 87 fixedly secured to the left end of the locking rail 86 and located in a slot 85 defined longitudinally in the lower portion of the handle 82. The locking rail 86 is pivotally supported from the support rail 24 by a plurality of bars 88 and moves in response to actuation of the handle 82 from an inoperative position parallel to and spaced from the support rail 24 (see FIGS. 2 and 3) to an operative position parallel to and adjacent to the support rail 24 (see FIG. 5). More specifically, the upper end of each bar 88 is pivotally connected to the rail 86 by a pivot pin 89 which comprises a double-headed rivet or the like, while the lower end of each bar 88 is connected directly to a brakeshoe arrangement located within the support rail 24.

One of the brakeshoe arrangements is illustrated in FIG. 6 and, as shown, the lower end of the bar 88 is fastened to a threaded member 90 which engages a nut 91 fixedly secured to the vertical wall of support rail 24. As the bar 88 is rotated, the threaded member advances to the right (as seen in FIG. 6) to cause a brakeshoe 92 to engage the indicator rod 50. More specifically, the lower end of the bar 88 is frictionally secured between a washer 94 and a nut 95 which is threaded onto the member 90. The nut 95 abuts against one side of the bar 88 and clamps the other side of the bar 88 against the washer 94 which abuts against the head 96 of the member 90. Accordingly, the bar 88 and threaded member 90 are rotatably secured together so that any rotary movement of the bar 88 caused by the movement of the locking rail 86 is imparted to the threaded member 90. Inasmuch as the member 90 threadedly engages the nut 91, any clockwise rotation, as viewed in FIGS. 2 and 3, and 5, cause the threaded member 90 to advance to the right as seen in FIG. 6. Accordingly, the right end 90a of the threaded member 90 drives the brakeshoe 92 into engagement with the indicator rod 50. The movement of the brakeshoe 92 to the right causes the indicator rod 50 likewise to move to the right and abut against the right edge of the openings 97 defined in the upper and lower walls of the support rails 24. Accordingly, the rotary movement of the threaded member 90 causes the indicator rod 50 to be locked against the support rail 24 and thereby prevents subsequent movement of the rod 50 and hence movement of the eyelets 52 and cord 54.

It will thus be understood that when the latching handle 82 is moved into its operative inclined position shown in FIG. 5, the indicator rods 50 are wedged against the support rail 24 by the brakeshoes 92. Thus, the eyelets 52 and cord 54 are held in their displaced positions at the time the latching mechanism 80 is actuated. Of course, when the latching mechanism 80 is released and the handle 82 is returned to its vertical position shown in FIGS. 2 and 3, the brakeshoes 92 move to the left, as seen in FIG. 6, and the indicator rods 50 are freed from clamping engagement with the support rail 24. If the individual has climbed off the slats 34 and the latching mechanism 80 is released, the springs 44, which previously had been held in compression by the latching mechanism 80, urge the caps 42 and hence the actuator rods 40 upwardly. As a result, the slats 34 are moved upwardly and the grommets 41 abut against the undersurface of the rail 18 to their original horizontal position shown in FIGS. 1 and 2, while the indicator rods 50 mechanically linked to the actuator rods 40 move upwardly into their inoperative positions shown in FIG. 2. To prevent the eyelets 52 from engaging the upper ends of the slots 31, a limit bar 98 is fixedly secured to the rear side of the panel 30 above the rods 50. The limit bar 98 is so located on the panel 30 that the upper ends of the rods 50 engage the bar 98 before the eyelets 52 engage the upper ends of the slots 31. By this arrangement, the eyelets 52 are not bent or deformed and the cord 54 is not pinched or clamped by a deformed eyelet 52.

In operation, the latching handle 82 is set in its inoperative position and an individual, desirous of knowing his weight distribution, lies down on the middle of the slats 34. The slats 34 are consequently depressed in accordance with the weight distribution of the individual and the actuator rods 40 move downwardly to compress the springs 44 proportionately to the amount of displacement of the slats 34. Since the indicator rods 50 are mechanically connected to the actuator rods 40 through the levers 60, the indicator rods 50 move downwardly proportionately to the downward movement of the actuator rods 40 to cause their associated eyelets 52 to assume correspondingly displaced positions. With the cord 54 threaded through the eyelets 52 portions of the cord 54 are also depressed to provide a graphic view of the weight distribution of the individual.

With the individual properly positioned on the middle of the slats 34, the latching handle 82 is moved to its operative position, thereby causing the bars 88 to rotate the threaded members 90, with the result that the brakeshoes 92 engages the indicator rods 50 and bind the rods 50 to the support rail 24. Since the indicator rods 50 are displaced different amounts, in accordance with the weight distribution of the individual, different portions of the indicator rods 50 engage the support rail 24.

With the latching mechanism 80 rendered operative, the individual can climb off of the indicating apparatus 10 and view more clearly from a vertical position his weight distribution. Furthermore, the data obtained from the indicating means 35 can be logged in a suitable recording device, for example, a notebook or the like. When the recording has been completed, the latching handle 82 is returned to its vertical position, whereupon the bars 88 are rotated counterclockwise, as shown in FIGS. 2 and 3, to withdraw the threaded members 90 from the nut 91 and move the brakeshoes 92 away from the indicator rods 50. Inasmuch as no weight is placed on the slats 34, the springs 44 are rendered operative to cause the slats 34, actuator rods 49, and indicator rods 50 to move into their inoperative positions.

The weight distribution of any number of individuals can be readily determined by having each individual lie down on the slats, actuating the latching mechanism 80, recording the weight distribution indicated by the cord 54, and then releasing the latching mechanism 80.

While the embodiment described herein is at present considered to be preferred, it is understood that various modifications and improvements may be made therein, and it is intended to cover in the appended claims all such modifications and improvements as fall within the true spirit and scope of the invention.

We claim:

1. Apparatus for visually indicating the weight distribution of a body comprising a frame having a back portion, a plurality of spaced apart side-by-side members adapted to support said body and movably supported from the front of said frame so as to extend toward said back portion, visual indicating means including parts extending through and disposed in front of said back portion for registering the distribution of weight of said body when on said plurality of members, means supported from said back portion for interconnecting said plurality of members and said visual indicating means, and means supported from said back portion for latching one of said means when said body is on said plurality of members so that said indicating means visually indicates the weight distribution of said body after it is removed from said supporting means.

2. Apparatus for visually indicating the weight distribution of a body comprising a frame having a back portion, a plurality of spaced apart side-by-side slats hingedly supported from the front of said frame for supporting said body, visual indicating means including parts extending through and disposed in front of said back portion for registering the distribution of weight of said body when on said plurality of slats, means interconnecting the rear portion of said slats and said visual indicating means, and means for latching one of said means when said body is on said plurality of members so that said indicating means visually indicates the weight distribution of said body after it is removed from said slats.

3. Apparatus for visually indicating the weight distribution of a body comprising a frame having a back portion, a plurality of spaced apart side-by-side members adapted to support said body and pivotally supported from front of said frame so as to extend toward said back portion, visual indicating means including parts extending through and disposed in front of said back portion for registering the distribution of weight of said body when on said plurality of members, and means including a handled rack arrangement for latching said indicating means to said frame means when said body is on said plurality of members so that said indicating means visually indicates the weight distribution of said body after it is removed from said supporting means.

4. Apparatus for visually indicating the weight distribution of a body comprising frame means, a plurality of generally horizontal side-by-side members pivotally mounted on the front of said frame means for supporting said body and movable from a first position to a second position corresponding to the weight of said body, a plurality of vertical actuating members movably supported from the back part of said frame means and connected respectively to the rearward parts of said supporting members, means for biasing said supporting members into said first position, a plurality of mechanical means for respectively visually indicating the amount of displacement of said supporting members and, thus, the weight distribution of said body, and a plurality of means for mechanically linking the plurality of indicating means and the plurality of actuating members, respectively, to transmit the relative displacements of said supporting members to said indicating means.

5. Apparatus for visually indicating the weight distribution of a body comprising frame means including a back part, a plurality of generally horizontal members pivotally mounted on the front of said frame means for supporting said body and movable from a first position to a second position corresponding to the weight of said body, vertical actuating members movably supported from the back part of said frame means and connected to the rearward parts of said supporting members, means supported from said back part for biasing said supporting members into said first position, a plurality of mechanical means supported from said back part for visually indicating the amount of displacement of said supporting members and, thus, the weight distribution of said body, and a plurality of means supported from said back part for mechanically linking the plurality of indicating means and the plurality of actuating members, respectively, to transmit the relative displacements of said supporting members to said indicating means.

6. The apparatus of claim 4, wherein each linking means includes means for displacing its associated indicating means substantially more than the displacement of its associated supporting member in order that the difference in weight of various parts of said body can more readily be portrayed by said plurality of indicating means.

7. Apparatus for visually indicating the weight distribution of a body comprising frame means including a back panel having a plurality of spaced slots, a plurality of members pivotally mounted to the front of said frame means for supporting said body and movable from a first position to a second position corresponding to the weight of said body, actuating members movably supported from said back panel and connected to said supporting members, means for biasing said supporting members into said first position, a plurality of rods having indicating elements extending through the slots of said panel for viewing from the front of said panel, means located in front of the back panel for interconnecting said indicating elements and a plurality of bars for interconnecting said plurality of actuating members and said rods to effect the displacement of said indicating elements in accordance with the displacement of said supporting members and hence the weight distribution of the body, and means for effecting the latching of the indicating elements when said body is resting on said supporting members to assure that the weight distribution of said body is visually indicated after the body is removed from said supporting members.

References Cited in the file of this patent

UNITED STATES PATENTS

| | | |
|---|---|---|
| 322,870 | Turnbull | July 21, 1885 |
| 1,733,510 | Morton | Oct. 29, 1929 |
| 2,330,317 | Stewart | Sept. 28, 1943 |
| 2,590,498 | Bomberger | Mar. 25, 1952 |
| 2,976,725 | Byer | Mar. 28, 1961 |